US006826647B1

(12) United States Patent
Leyman (10) Patent No.: US 6,826,647 B1
(45) Date of Patent: Nov. 30, 2004

(54) VOICE OPERATED COMMUNICATIONS INTERFACE

(75) Inventor: Seth Leyman, Oakton, VA (US)

(73) Assignee: Communications-Applied Technology Co., Inc., Reston, VA (US)

( * ) Notice: Subject to any disclaimer, the term of this patent is extended or adjusted under 35 U.S.C. 154(b) by 493 days.

(21) Appl. No.: 09/847,943

(22) Filed: May 2, 2001

Related U.S. Application Data (60) Provisional application No. 60/201,304, filed on May 2, 2000.

(51) Int. Cl.[7] .................. G06F 13/00; H04L 12/28; H04B 7/14
(52) U.S. Cl. ................ 710/317; 710/316; 370/351; 455/15
(58) Field of Search ................. 710/316, 317; 370/351–360; 455/15

(56) References Cited

U.S. PATENT DOCUMENTS

| 4,484,344 A | | 11/1984 | Mai et al. |
| 4,578,815 A | * | 3/1986 | Persinotti .................. 455/15 |
| 4,941,187 A | | 7/1990 | Slater |
| 5,742,640 A | * | 4/1998 | Haoui et al. ............... 375/220 |
| 6,633,847 B1 | * | 10/2003 | Fang ........................ 704/270 |

OTHER PUBLICATIONS

Maxim Ultra Low–Power, Single/Dual–Supply Comparators, MAX921–MAX924 19–0115: REV3: 3/95, pp. 1–16.
Integrated Circuits, Data Sheet, 74HC/HCT4053 Triple 2–Channel Analog Multiplexer/Demultiplexer, Product Specification, Philips Semiconductors, Dec. 1990, pp. 1–17.
National Semiconductor; LM2940/LM2940C 1A Low Dropout Regulator, National Semiconductor Corporation, Jul. 2000, DS008822, pp. 1–17.
ACU–1000 Operations Manual, P/N 5961–200200, Revision 2.1, Oct. 1999, JPS Communications, Inc., Raleigh, NC (106 pages).

* cited by examiner

*Primary Examiner*—Tim Vo
(74) *Attorney, Agent, or Firm*—Pillsbury Winthrop LLP (57) ABSTRACT

A voice-operated communications interface permits communications between two or more groups using incompatible communications devices such as two-way radios.

40 Claims, 13 Drawing Sheets

VOICE OPERATED COMMUNICATIONS INTERFACE

RELATED APPLICATIONS

This application claims benefit of U.S. Provisional Patent Application No. 60/201,304, filed May 2, 2000 and entitled "VOICE-OPERATED RADIO INTERFACE."

BACKGROUND OF THE INVENTION

1. Field of the Invention

This invention relates to communications. More specifically, this invention relates to a communications interface between two or more disparate systems.

2. Description of Related Art

Public crisis events (such as natural disasters or terrorist actions) may demand responses by several public safety agencies, including police, firefighters, and medical and rescue services. In order for these agencies to deploy their services more effectively and remediate the situation more quickly, it is critical to establish command and control communications with as little delay as possible. Therefore, it is desirable at least for the commanders of first response agencies to be able to communicate with one another in order to coordinate their operations at the scene. Unfortunately, a lack of interoperability (i.e. useable connectivity) between the communications apparatus of many such organizations often impedes such cooperation in practice. A similar deficiency may arise when military units require real-time transfer of information but utilize dissimilar radio-frequency bands and/or modulation schemes.

A proposed solution to this problem is a central device to receive all of the various RF signals and rebroadcast them over the appropriate RF bands. Such a device, however, is large and bulky, must be transported rather than carried, requires the on-site availability of significant power resources, requires highly trained personnel to set up and operate, and is expensive both to purchase and to maintain. A portable and rapidly deployable device that provides such interoperability has not yet existed, much less a device that has such features combined with ease of operation and low cost.

SUMMARY OF THE INVENTION

An interface according to an embodiment of the invention includes a number of input/output (I/O) ports, a corresponding number of voice-operated-transmit (VOX) circuits, and a switching matrix.

DETAILED DESCRIPTION

Figure 1:
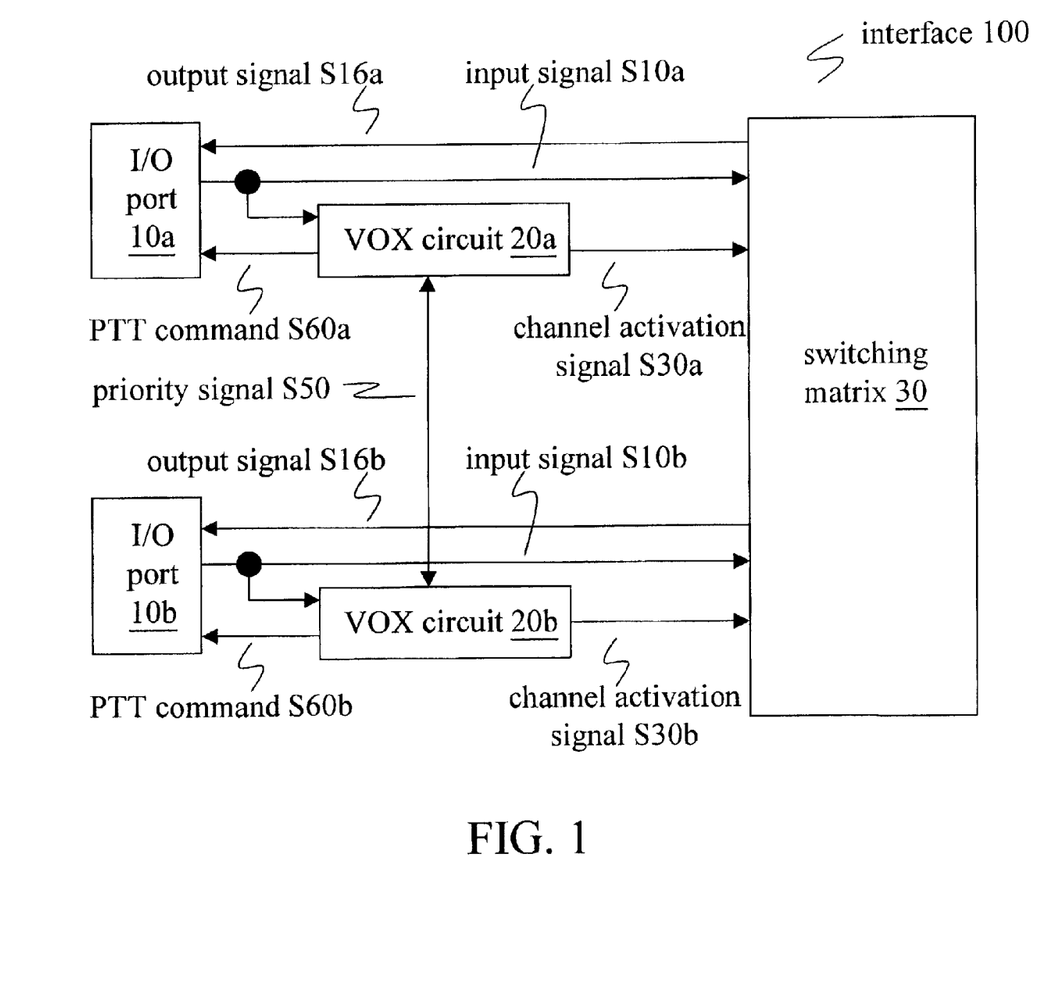
FIG. 1 shows a block diagram of an interface 100 according to an embodiment of the invention.

FIG. 1 shows a block diagram of an interface 100 according to an embodiment of the invention. Interface 100 connects to a number of communications devices via input/output ports 10. Specifically, interface 10 receives an input signal S10 from, and transmits an output signal S16 and a PTT (push-to-transmit) command S60 to, the communications device connected to each input/output port 10.

Interface 100 includes a number of VOX circuits 20, each receiving a input signal S10 via the respective I/O port 110. Each VOX circuit is also coupled to a common control bus that carries a priority signal S50 to the VOX circuits 20. In accordance with these inputs, each VOX circuit 20 outputs a channel activation signal S30 to a switching matrix 30 and a PTT command S60 through the respective I/O port 10. As described below, the VOX circuits 20 may be identical to one another, or one or more of the VOX circuits 20 may be adjusted or constructed differently from another according to the characteristics of a particular communications device.

Interface 100 also includes a switching matrix 30 that receives the input signals S10 and channel activation signals S30 and produces the output signals S16 accordingly. In the signal paths between I/O port 10 and switching matrix 30, it may be desirable to provide circuits (active and/or passive) that perform signal conditioning operations such as RF suppression, DC blocking, lowpass filtering, and/or signal level adjustment (not shown).

Figure 2:
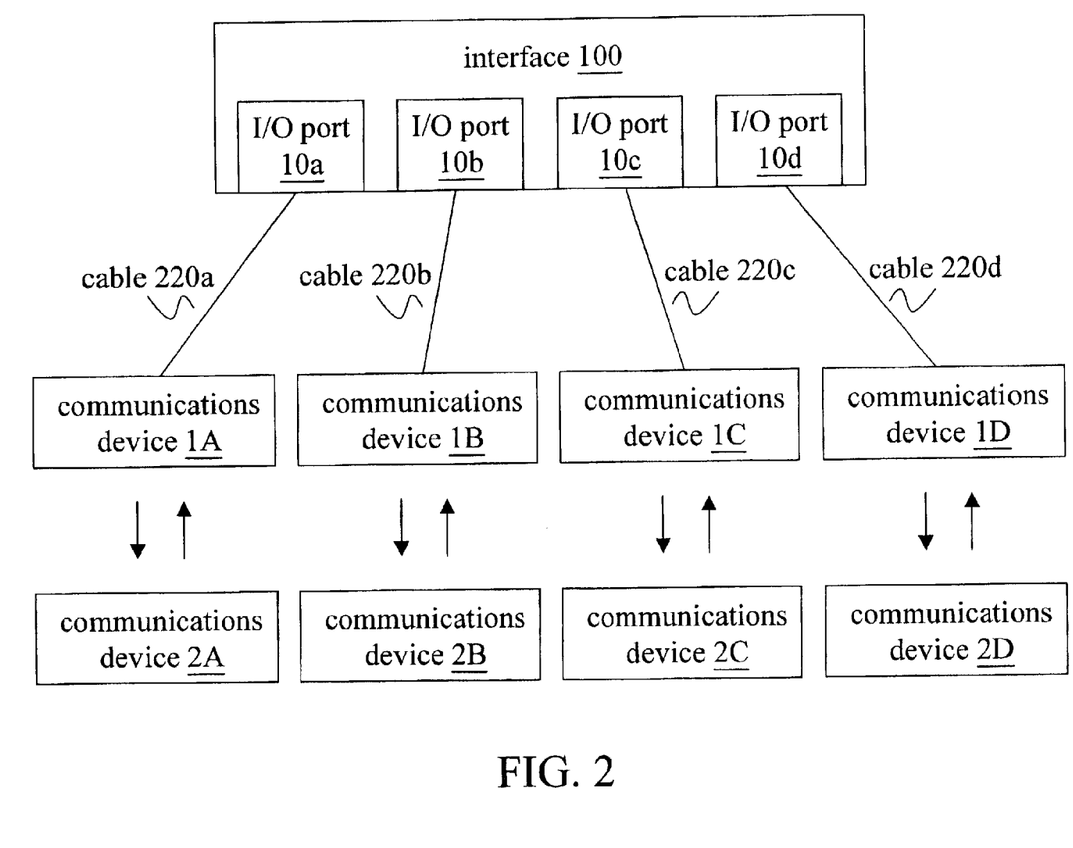
FIG. 2 illustrates an exemplary application of an interface 100.

FIG. 2 shows a block diagram of an application of interface 100. In this example, communications devices 1A–1D include portable two-way radios (e.g. 'walkie-talkies', transceivers) that may communicate on different bands (such as HF, VHF, UHF, sideband, etc.) and/or using different modulation schemes, and one communications device 1 is provided for each communications path to be supported. Because the communications devices 1A–1D used to support the various paths are stand-alone off-the-shelf units, they can be replaced easily and individually in case of failure. Moreover, adding a communications path to a new service group may be performed easily on-site, e.g. by simply connecting a communications device drawn from one of the members of that group to interface 100 as described below. Further implementations of interface 100 extend such interoperability to other communications devices such as cellular and wireline telephones, 3-wire or 4-wire intercoms, tape recorders, and one-way radios.

Each communications device 1 is connected to a corresponding I/O port 10 through a signal and control cable 220 that carries input signal S10, output signal S16, and PTT command S60. Cable 220 may terminate at either end with one or more standard connectors (such as 2.5- or 3.5-mm miniature audio plugs), and/or specialized connectors may be used, depending upon the particular physical characteristics of the associated communications device. It is also possible for the audio and PTT command signals to be carried between port 10 and a communications device 1 over two or more separate cables rather than through a single signal and control cable 220. Upon connection with communications devices 1A–1D as described above, interface 100 operates as described herein to enable users of communications devices 2A–2D (each matching a respective one of the devices 1A–1D) to communicate with each other.

Figure 3:
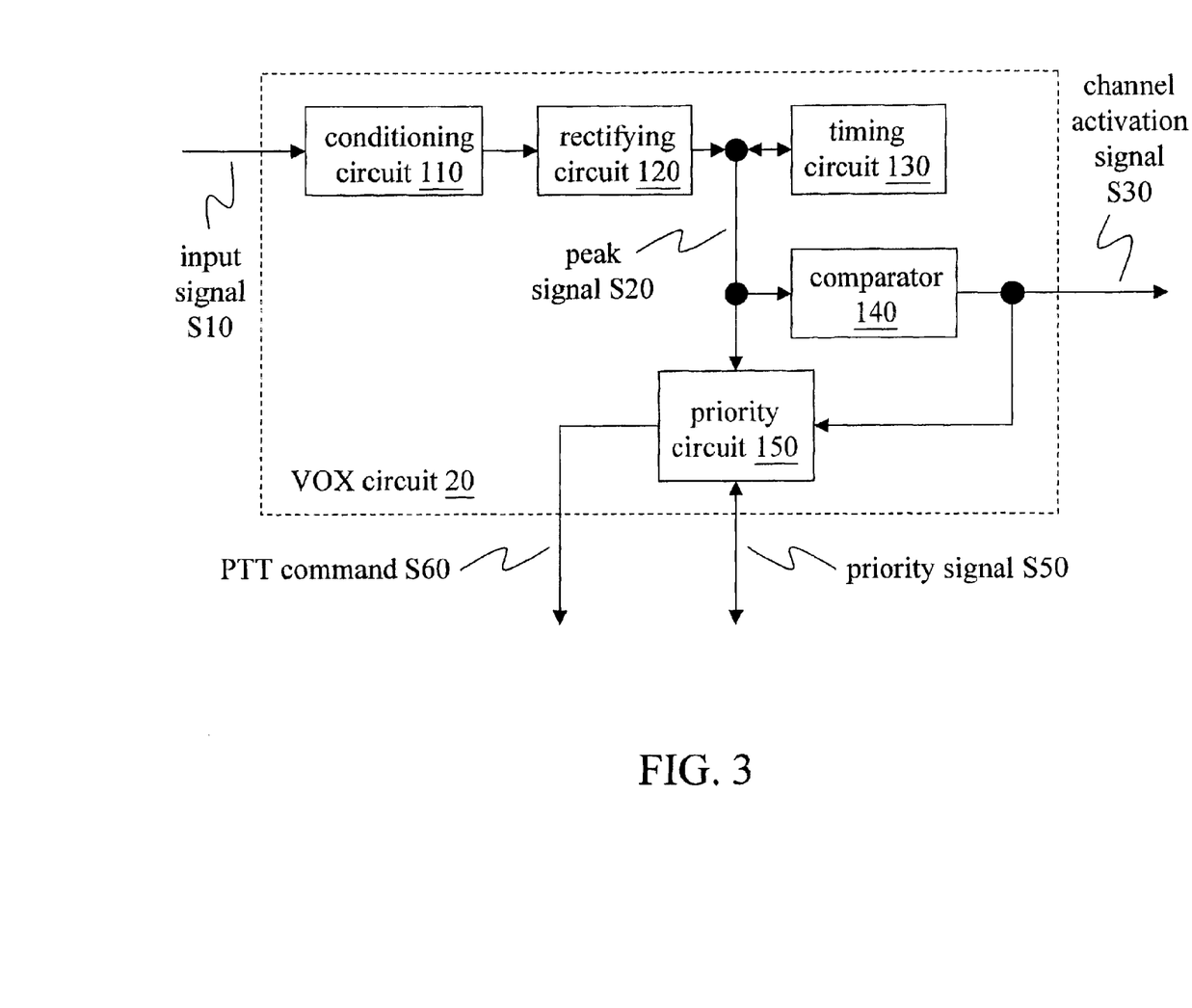
FIG. 3 shows a block diagram of a VOX circuit 20 according to an embodiment of the invention.

FIG. 3 shows a block diagram of a VOX circuit 20 according to an embodiment of the invention. Conditioning circuit 110 receives input signal S10 and outputs a conditioned audio signal to rectifying circuit 120. Conditioning circuit 110 may perform signal processing operations on input signal S10 such as gain, equalization, and filtering. In an exemplary implementation, conditioning circuit 110 provides variable gain by including an operational amplifier (op amp) configured to have variable resistive feedback. The several VOX circuits 20 may be implemented on separate circuit boards within interface 100, or one or more of the VOX circuits 20 may be implemented on the same board.

Conditioning circuit 110 may be constructed to perform equalization operations as desired according to the output characteristics of a particular communications device. For example, a cellular or wireline telephone may provide an audio signal having a different spectral distribution than a two-way radio.

Existing VOX designs are often disfavored because of a susceptibility to false keying in response to interference such as ambient noise. It may be desirable for conditioning circuit 110 to narrow the frequency content of the signal it outputs to rectifying circuit 120 in order to enhance rejection of ambient noise by VOX circuit 20. For example, conditioning circuit 110 may include a bandpass filter centered at approximately 125 Hz, which corresponds to a fundamental frequency ($F_0$) of the voice of a typical adult male speaker (alternatively, the frequency may be limited to a band near or including 210 Hz, the fundamental frequency of the voice of a typical adult female speaker). Depending upon the intended application, the energy content of one or more different frequency bands may be used to establish a keying event. In a case where gain and bandpass equalization or filtering is provided, it may also be desirable to divide the bandpass operation into a lowpass and a highpass operation such that the gain operation may be performed between the filtering operations.

Another feature that may help to reduce the probability of false keying is the provision of RF shielding within and around VOX circuit 20. This shielding may comprise filtering on the input and output signal paths, on the paths to the power supply rails, and on paths between stages. Additional RF shielding may be provided in the construction of the enclosure which houses the apparatus. In this way, the sensitivity of VOX circuit 20 to a RF burst from a nearby transmitter may be significantly reduced.

Rectifying circuit 120 receives the conditioned audio signal and outputs a peak signal S20. In one implementation, rectifying circuit 120 includes a nonlinear device such as a PN junction device. For example, the nonlinear device may be a diode or the base-emitter or base-collector junction of a bipolar junction transistor (BJT).

Comparator 140 receives peak signal S20 and compares it to a reference voltage Vc. In one example, the reference voltage Vc has an approximate value of Vcc/3. When the voltage of peak signal S20 exceeds the reference voltage Vc, comparator 140 outputs a channel activation signal S30. It is possible but not necessary to choose a different reference voltage Vc for each VOX circuit 20.

It may be desirable to continue channel activation signal S30 for some period of time after the voltage of peak signal S20 falls below the reference voltage Vc. Timing circuit 130 provides a tail delay to continue a level of peak signal S20. In one example, timing circuit 130 includes a capacitance to ground in parallel with a resistance. When peak signal S20 is active, the capacitance is charged. When the conditioned audio signal becomes less active or inactive, the charged capacitance maintains a voltage level of peak signal S20 until the resistance discharges it to ground. In a further example, the resistance is variable to provide a time constant of from less than one second to several seconds.

Priority circuit 150 receives peak signal S20 and channel activation signal S30 and outputs PTT command signal S60 to the associated communications device. Priority circuit 150 is also coupled to a bidirectional priority signal S50. In an exemplary implementation, priority signal S50 is common to all of the VOX circuits 20.

Priority circuit 150 responds to an activation of either channel activation signal S30 (by comparator 140) or priority signal S50 (by another instance of priority circuit 150). In a case where channel activation signal S30 becomes active, priority circuit 150 asserts priority signal S50 and does not assert PTT command signal S60. As a result, other channels are prevented from being activated, and the associated channel is maintained in receive mode.

In a case where another circuit asserts priority signal S50, priority circuit 150 asserts PTT command signal S60 and prevents assertion of channel activation signal S30. As a result, the channel is prevented from being activated and is switched into transmit mode.

Figure 4:
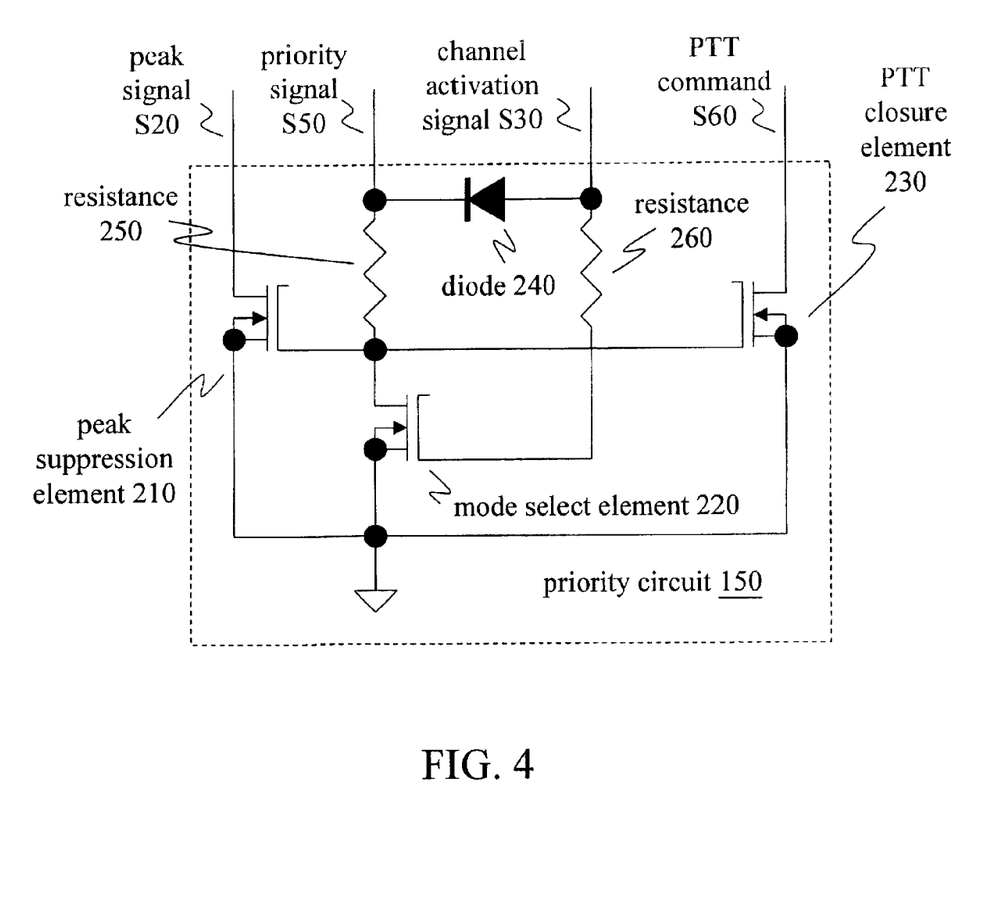
FIG. 4 shows a schematic diagram of a priority circuit 150 according to an embodiment of the invention.

FIG. 4 shows an exemplary implementation of priority circuit 150 that includes a peak suppression element 210, a mode select element 220, a PTT closure element 230 (all implemented in this example using FETs), and a diode 240. This implementation also includes two resistances 250 and 260 (each resistance having a value of 100 kilohms) that may slow a response of mode select element 220 and reduce an incidence of false responses.

In a case where priority circuit 150 receives channel activation signal S30, mode select element 220 is turned on. The resulting path to ground in mode select element 220 prevents peak suppression element 210 from being turned on, thus preventing peak suppression element 210 from pulling peak signal S20 to ground. The same path to ground also prevents PTT closure element 230 from being turned on, thus maintaining the associated communications device in a receive mode. Channel activation signal S30 also causes priority signal S50 to be asserted through diode 240.

In a case where priority circuit 150 receives priority signal S50, peak suppression element 210 is turned on. The resulting path to ground in peak suppression element 210 pulls peak signal S20 to ground, thus preventing channel activation signal S30 from being asserted (by keeping peak signal S20 from exceeding the reference voltage Vc and by preventing charging of the capacitance in timing circuit 130). Priority signal S50 also causes PTT closure element 230 to turn on, thus pulling PTT command S60 to ground and sending a PTT closure command to the associated communications device.

Figure 5:
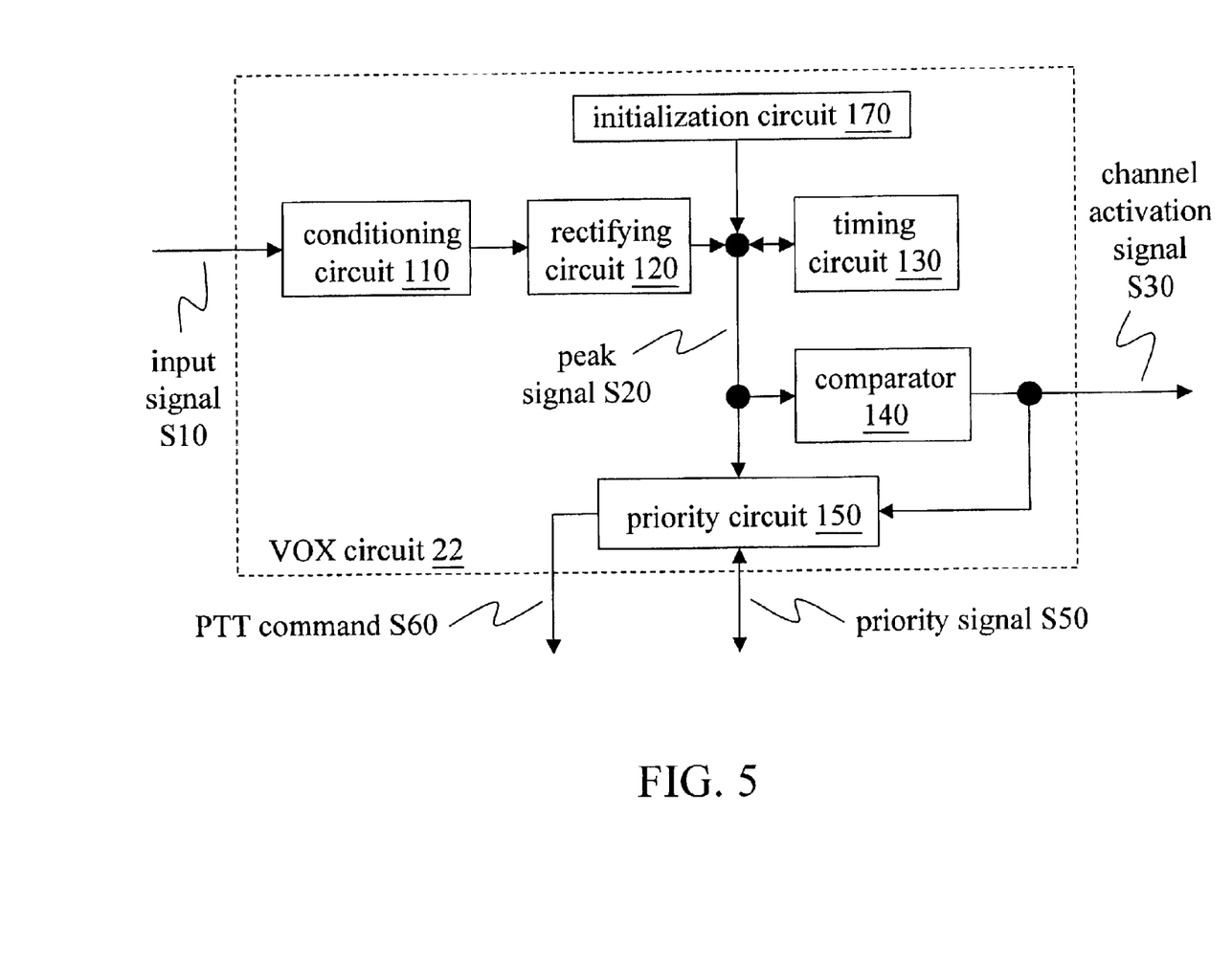
FIG. 5 shows a block diagram of an alternate implementation 22 of a VOX circuit according to an embodiment of the invention.

FIG. 5 shows a VOX circuit 22 according to an alternate implementation of VOX circuit 20. VOX circuit 22 includes an initialization circuit 170 that prevents the assertion of channel activation signal S30 during power-up of the interface 100. For example, initialization circuit may pull peak signal S20 below the reference voltage Vc (e.g. to ground) during power-up. In an exemplary implementation, initialization circuit 170 includes a BJT having its collector coupled to peak signal S20, its emitter coupled to ground, and its base coupled to a supply voltage of interface 100 through a capacitance. A transient occurring on the supply voltage during power-up causes the capacitance to conduct a voltage to the base of this BJT, creating a conductive path between the collector and emitter until the supply voltage reaches a steady state.

Figure 6:
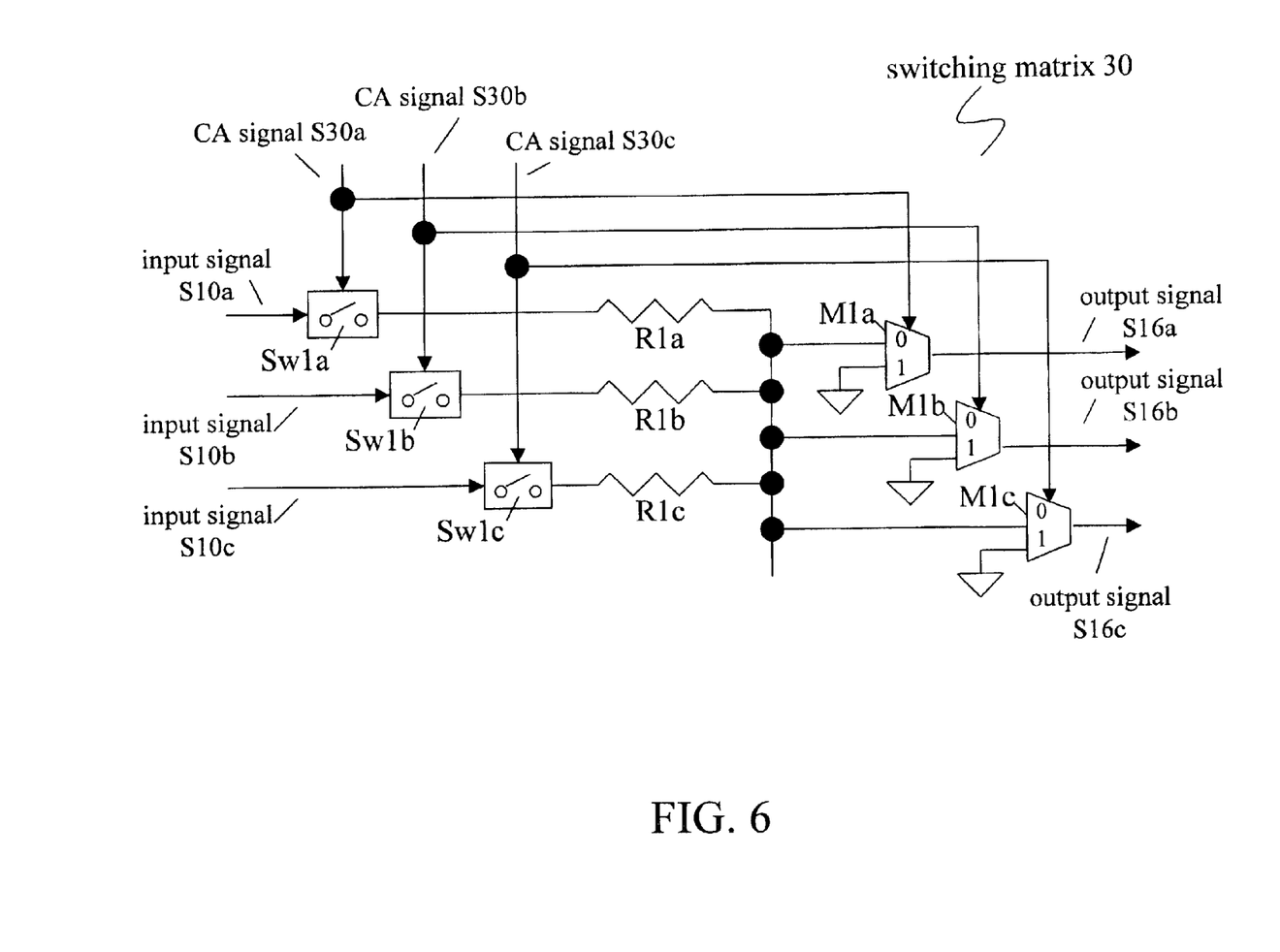
FIG. 6 shows a block diagram of a switching matrix 30.

FIG. 6 shows a block diagram of a switching matrix 30. Each input signal S10 is inputted to a corresponding analog switch Sw1. Switch Sw1 is closed upon assertion of channel activation (CA) signal S30, at which time input signal S10 passes through resistance R1 onto a common bus. A corresponding multiplexer M1 also receives CA signal S30, and assertion of CA signal S30 causes that multiplexer M1 to select a null input for output signal S16. The other multiplexers M1 (i.e. those receiving an unasserted CA signal S30) select the input signal S10 on the common bus for the corresponding output signals S16. In an exemplary implementation, switches Sw1 and multiplexers M1 are implemented using analog multiplexers of the 74HCT family.

Figure 7:
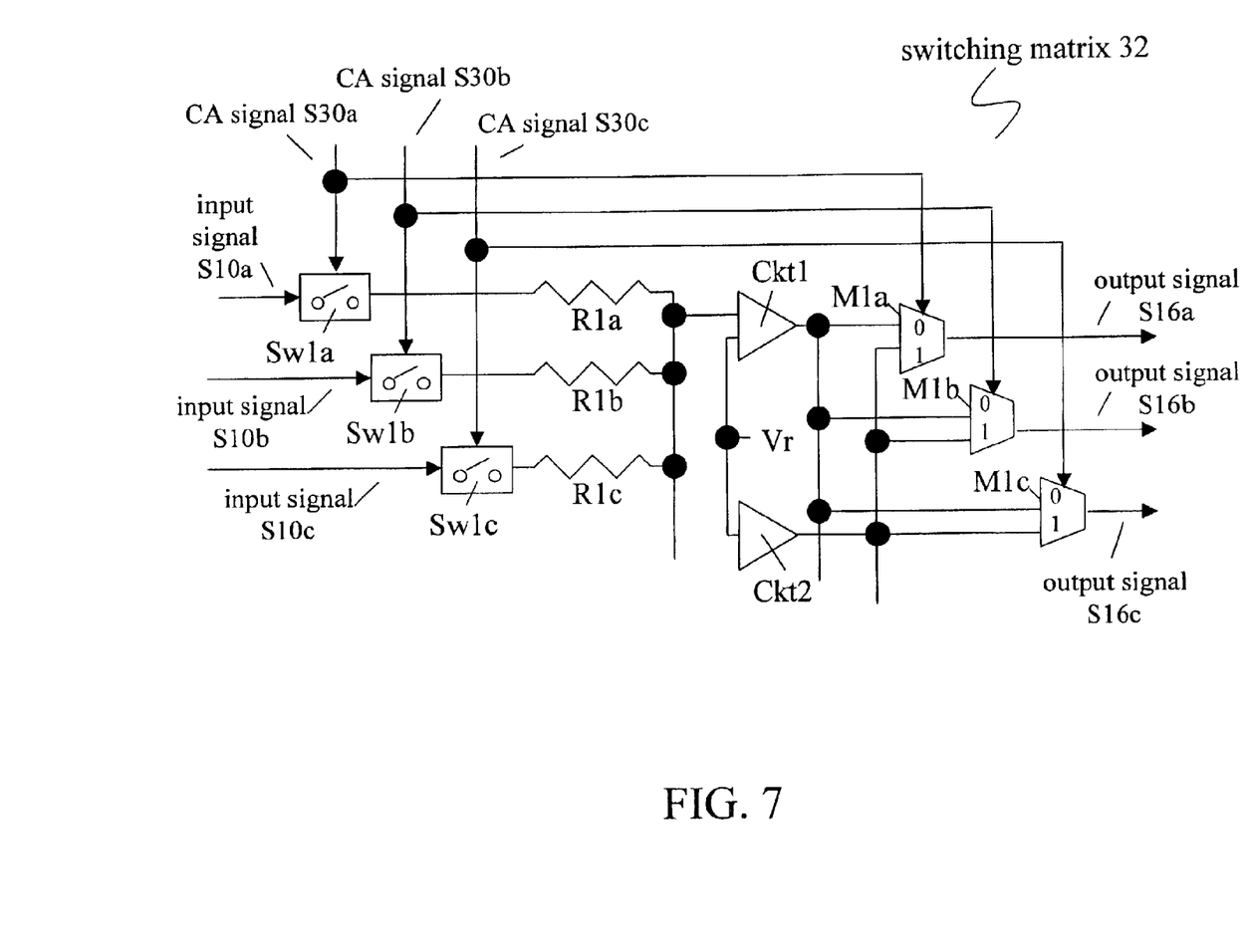
FIG. 7 shows an alternate implementation 32 of a switching matrix according to an embodiment of the invention.

FIG. 7 shows an alternate implementation 32 of a switching matrix according to an embodiment of the invention. In this implementation, a circuit Ckt1 conditions the signal on the common bus before it passes into multiplexers M1. Rather than a null input as shown in FIG. 6, a nonnull input based on a reference voltage Vr is selected by the multiplexer M1 corresponding to the asserted CA signal S30. The nonnull input may be produced by a circuit Ckt2 as shown in FIG. 7. Reference voltage Vr may be chosen to be at least one-quarter of Vcc; in one embodiment, reference voltage Vr is approximately one-half of Vcc. Use of a nonnull voltage rather than a null voltage may improve audio quality by reducing popping noise at keying events.

Figure 8:
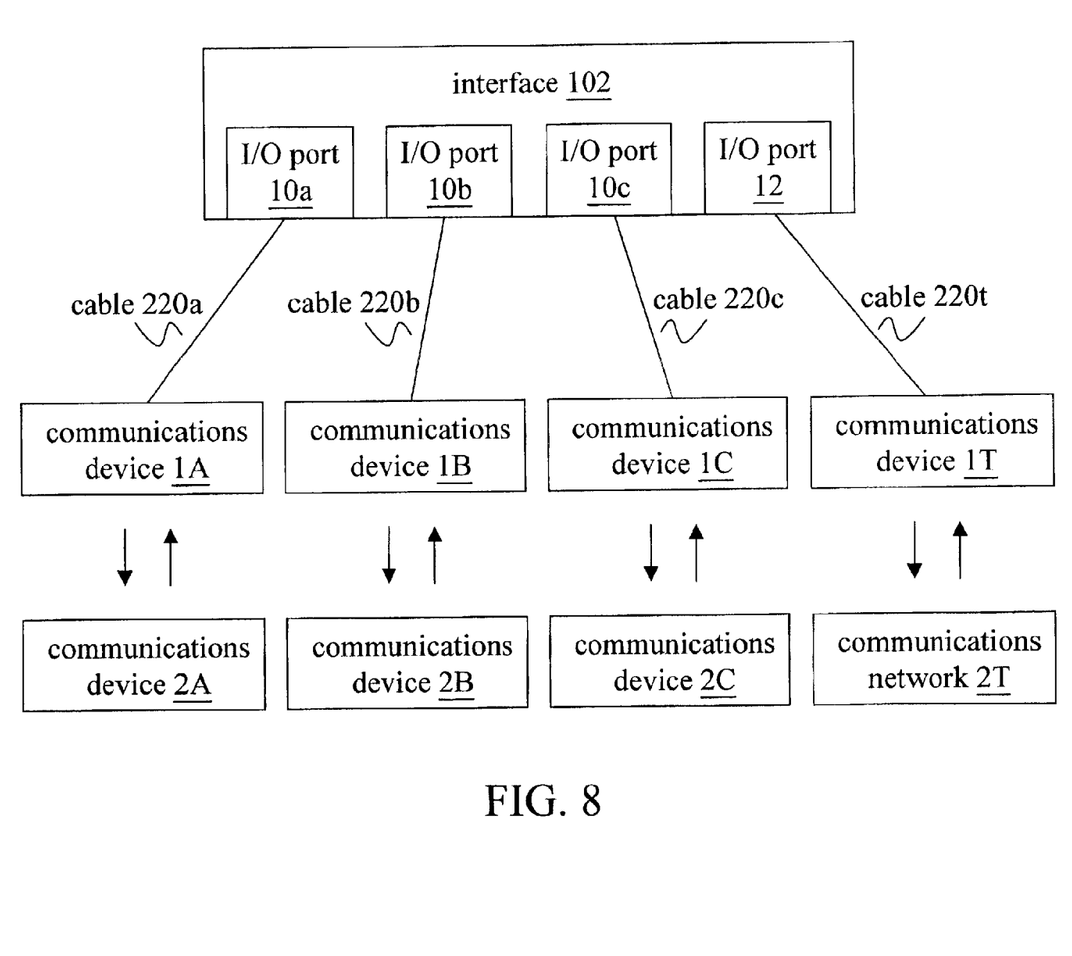
FIG. 8 illustrates an exemplary application of an alternate implementation 102 of an interface according to an embodiment of the invention.
Figure 9:
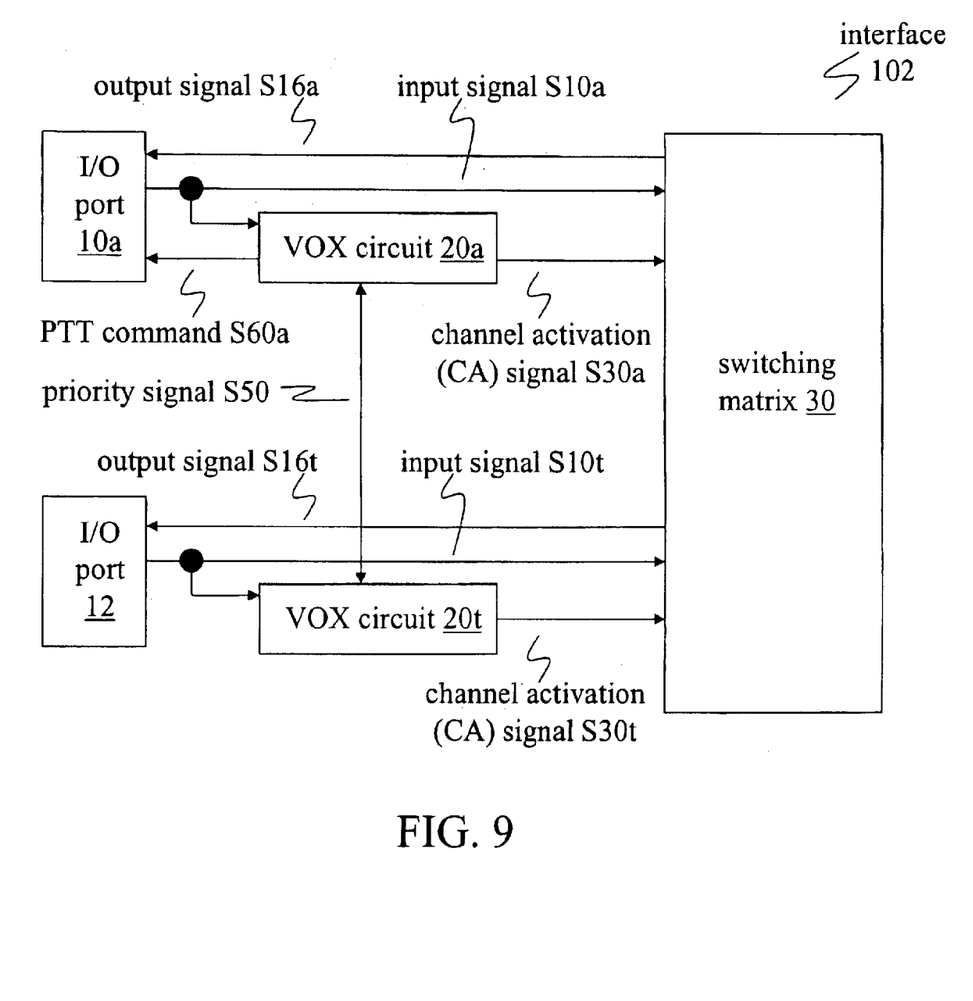
FIG. 9 shows a block diagram of the alternate implementation 102 of an interface according to an embodiment of the invention.
Figure 10:
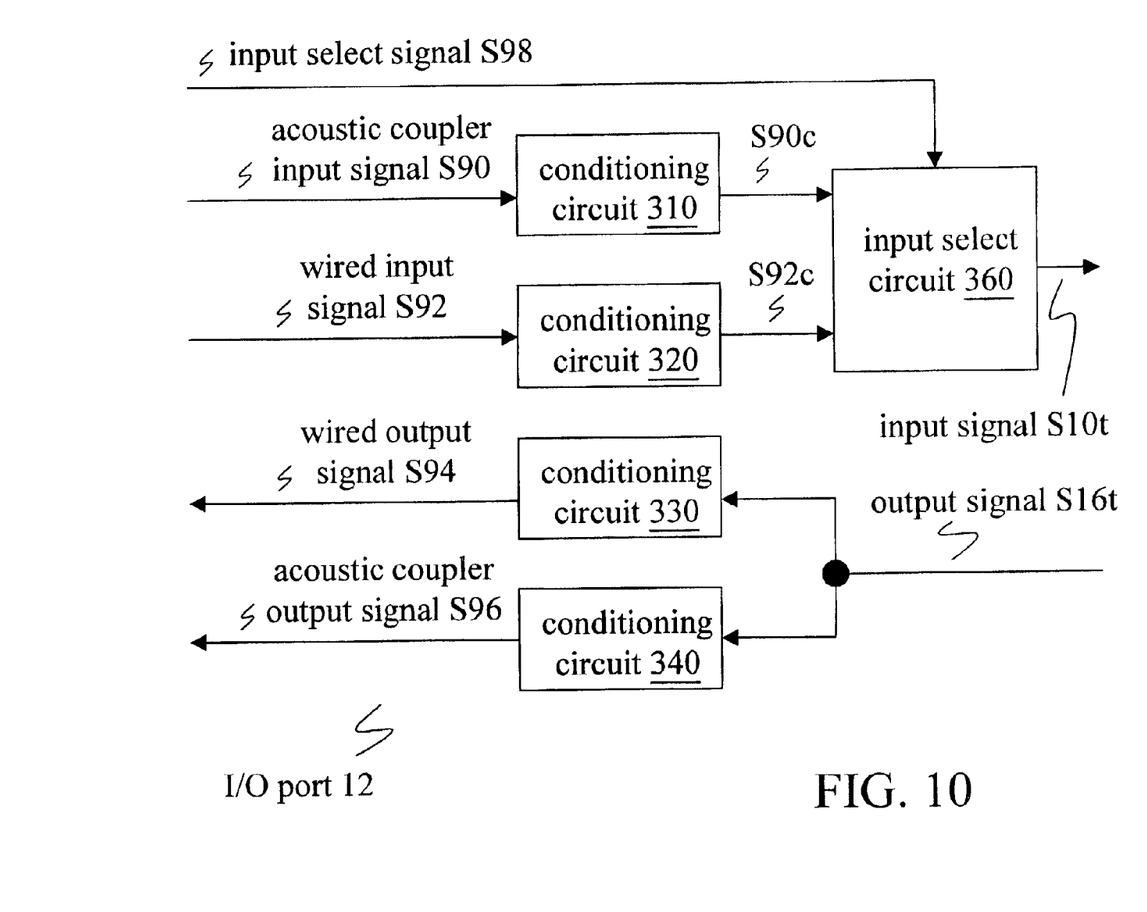
FIG. 10 shows a block diagram of an input port 12.

FIG. 8 illustrates an exemplary application of an alternate implementation 102 of an interface according to an embodiment of the invention that includes an I/O port 12 that communicates with a telephone, which may be wired (e.g. having a landline connection to the PSTN) and/or wireless (e.g. having a connection to a cellular telephone network), over a cable 220t. In one embodiment of the invention, cable 220t includes an acoustic coupler. FIG. 9 shows a block diagram of interface 102. In order to compensate for a difference in audio quality (e.g. spectral content) in the signal provided by the telephone and/or the acoustic coupler, I/O port 12 may include gain and/or equalization operations in conditioning circuits 310–340 as shown in FIG. 10. In an exemplary implementation, conditioning circuit 340 outputs an active differential (e.g. balanced) output on acoustic coupler output signal S96 to compensate for inefficiencies in the transfer of acoustic energy to the telephone.

Figure 11:
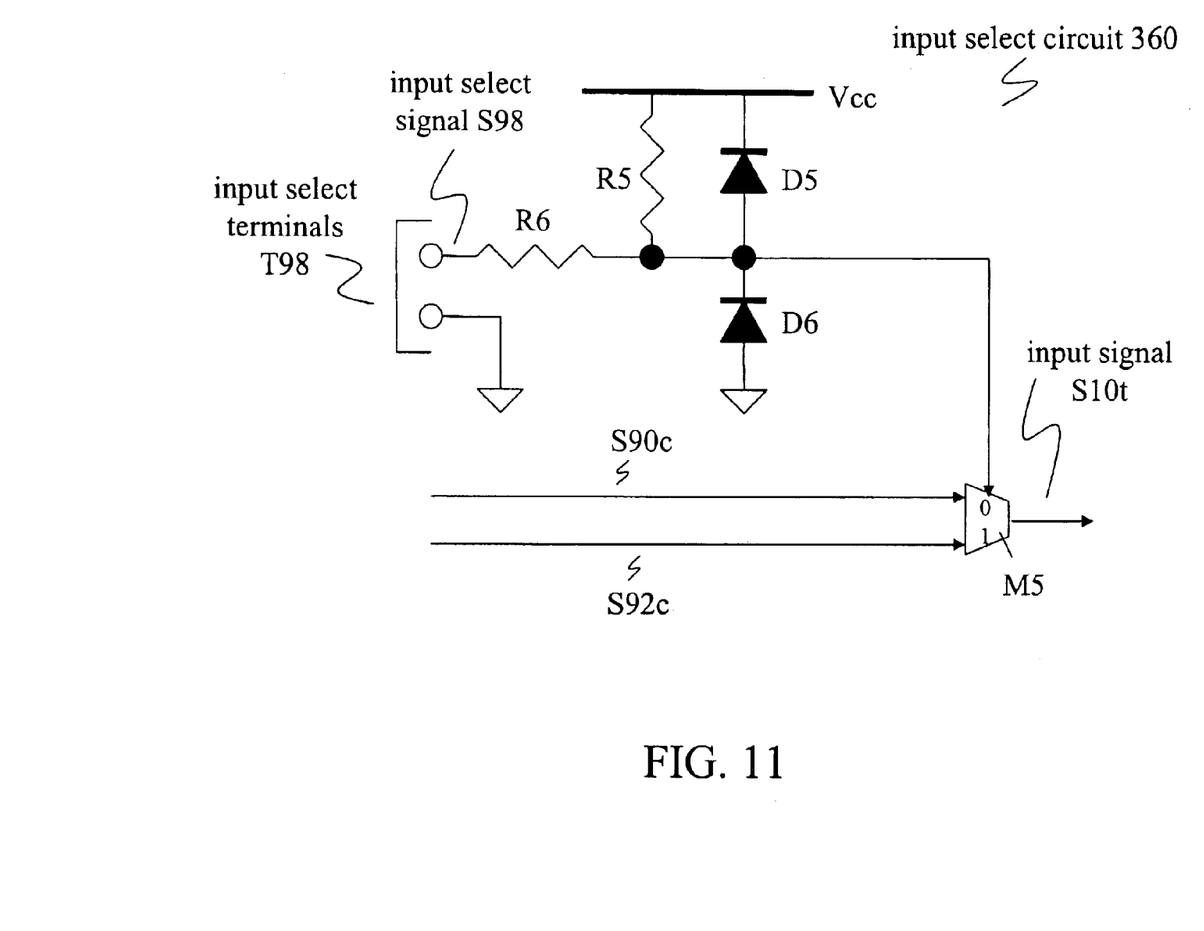
FIG. 11 shows a schematic diagram of an input select circuit 360.

FIG. 11 shows a schematic diagram of an input select circuit 360. By providing a short or an open circuit across input select terminals T98, cable 220t causes circuit 360 to select input signal S10t from among signals S90c and S92c (corresponding to acoustic coupler input signal S90 and wired input signal S92, respectively).

In a similar manner, an interface according to an embodiment of the invention may also be adapted to support communications paths to other keyed and nonkeyed devices such as 3-wire or 4-wire intercoms, tape recorders, or one-way radios. In an alternative embodiment, two or more interfaces 100 may be connected for increased capacity.

Figure 12:
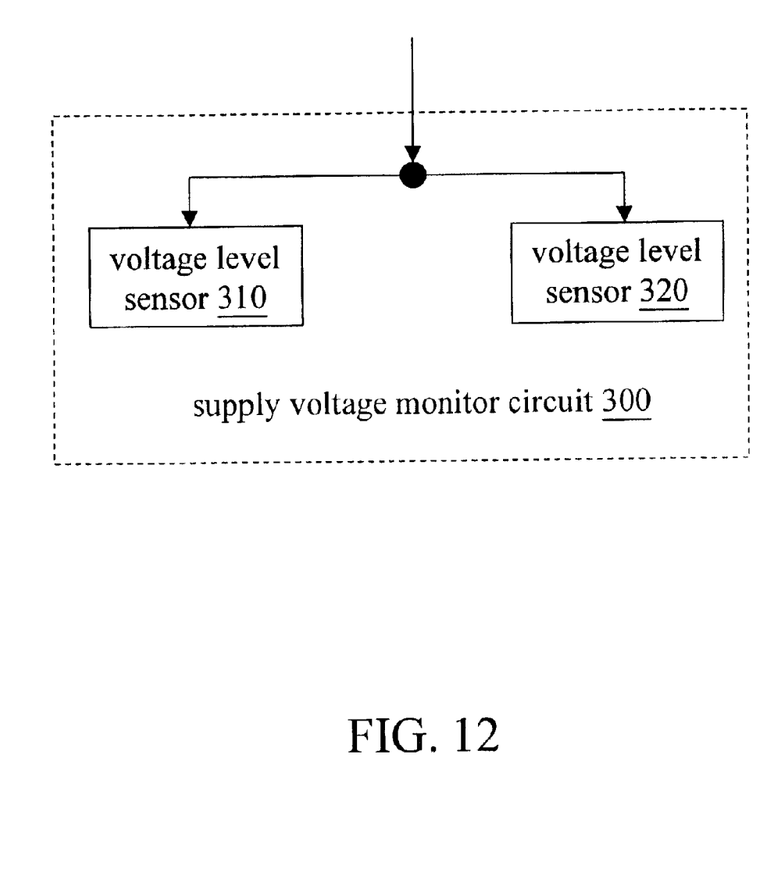
FIG. 12 shows a block diagram of a supply voltage monitor circuit 300.
Figure 13:
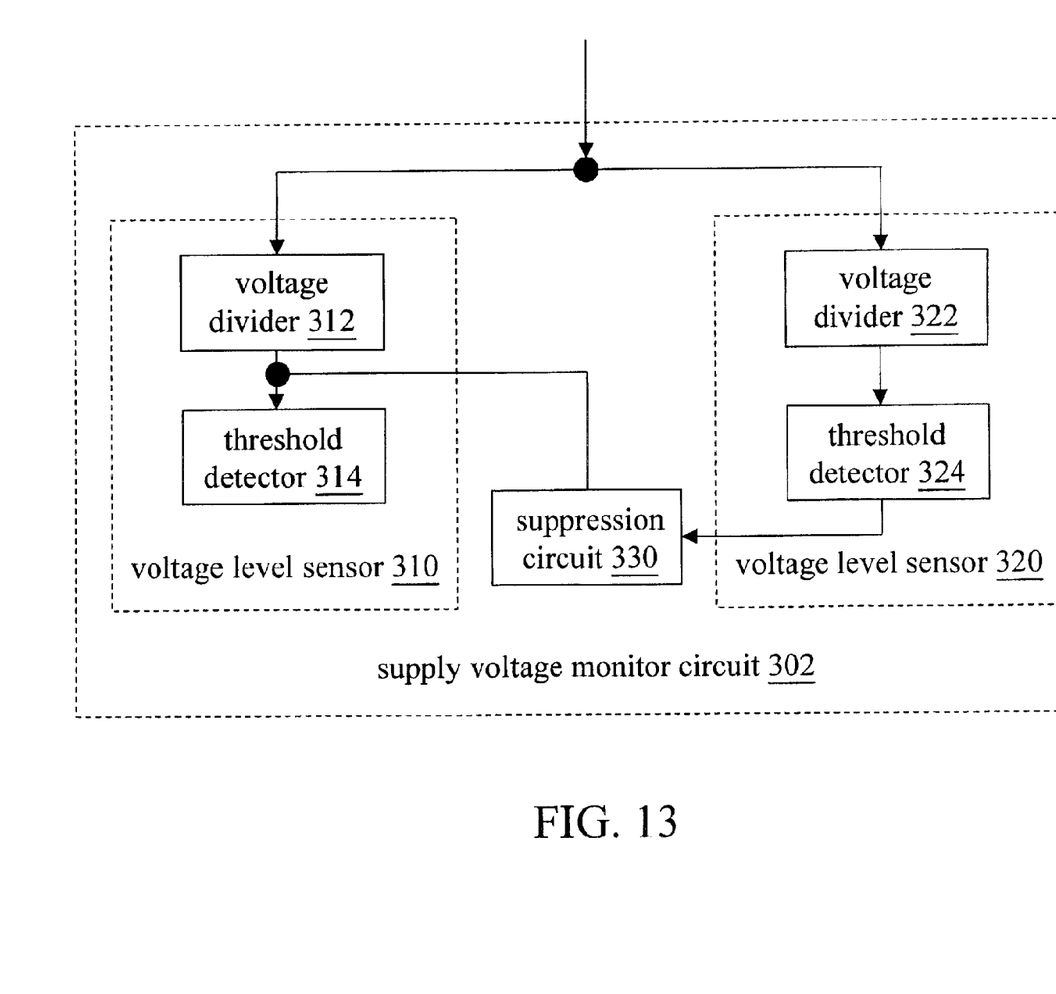
FIG. 13 shows a block diagram of an alternate implementation 302 of a supply voltage monitor circuit.

FIG. 12 shows a block diagram of a supply voltage monitor circuit 300 including two voltage level sensors 310 and 320. Each of these sensors 310 and 320 monitors the supply voltage by indicating a relation between the supply voltage and a predetermined threshold voltage. FIG. 13 shows a block diagram of an alternate implementation 302 of a supply voltage monitor circuit, in which each sensor 310/320 includes a voltage divider 312/322 and a threshold detector 314/324. In this implementation, sensor 320 is configured to have a higher threshold voltage than sensor 310. When sensor 320 indicates the predetermined relation between the supply voltage and its higher threshold voltage, the indication signal is also inputted to suppression circuit 330, which suppresses an indication by sensor 310 of a relation between the supply voltage and the lower threshold voltage.

An interface 100 according to an embodiment of the invention is designed to work reliably and at low power. Because the current demand of apparatus 100 is kept at a minimum, and because the communications devices 1A–1D are self-powered, apparatus 100 may operate reliably on common, primary-type, DC battery cells, a vehicle cigarette-lighter jack, or another low-power source such as may be readily available on the scene (e.g. a +28 VDC aircraft power bus), with no need for an inverter, generator or landline AC supply.

In addition to the benefits mentioned above, an interface according to an embodiment of the invention may be extremely portable and inexpensive, especially in comparison to existing alternatives. Moreover, such an interface allows a user with only minimal training to deploy a system for interoperated support of multiple communication paths and leave it to operate unattended.

In a further embodiment of the invention, switching matrix 30 is configurable so that an organizational structure among the communications devices 1A–1D may be incorporated. For example, communications received from members of one service group may generally be transmitted only to radios within that group, while communications received from any commander may be transmitted by all other communications devices. In a further embodiment of the invention, at least one of the cables 220 supports an additional control path so that the configuration of switching matrix 30 may be controlled at least in part by a control signal from the corresponding communications device.

In an interface according to a further embodiment of the invention, at least one of the cables 220 is replaced by a low-power RF link. For example, such a link may conform to a version of the Bluetooth specification (e.g. as approved for Part 15 radio devices operating in the 2.4 GHz ISM band or similar devices operating in another band). In a further implementation, a cable 220 carries an input signal S10 and a corresponding output signal S16, while a low-power RF link as described above carries the corresponding PET command S60.

What is claimed is:

1. An interface comprising:
    a plurality of input/output (I/O) ports, each configured and arranged to pass a corresponding input signal and a corresponding push-to-transmit (PTT) command; and
    a corresponding plurality of voice-operated-transmit (VOX) circuits, each configured and arranged to receive the corresponding input signal and to produce, according to a predetermined relation between a level of the input signal and a corresponding threshold, a corresponding channel activation signal;

a switching matrix configured and arranged to receive the plurality of input signals and channel activation signals, wherein the plurality of VOX circuits is further configured and arranged to prevent, during a period of assertion of a channel activation signal to the switching matrix, assertion of any other of the plurality of channel activation signals to the switching matrix, and wherein each among the plurality of VOX circuits is further configured and arranged to assert the corresponding PTT command to the corresponding I/O port when a noncorresponding channel activation signal is asserted; and wherein the switching matrix is further configured and arranged to produce an output signal based on an input signal corresponding to an asserted channel activation signal and to provide the output signal at least to the I/O ports corresponding to a nonasserted channel activation signal.

2. The interface according to claim 1, wherein the plurality of VOX circuits is further configured and arranged to inhibit an assertion of any among the channel activation signals to the switching matrix during a powering-up of the interface.

3. The interface according to claim 1, wherein each among the plurality of VOX circuits is further configured and arranged to receive an initialization signal during a powering-up of the interface and to inhibit an assertion of the corresponding channel activation signal to the switching matrix according to the initialization signal.

4. The interface according to claim 1, wherein at least one among the plurality of VOX circuits is configured and arranged to determine a level of the input signal over a frequency range of 100 Hertz to 500 Hertz and to produce the corresponding channel activation signal according to a predetermined relation between the determined level and a corresponding threshold.

5. The interface according to claim 1, wherein at least one among the plurality of VOX circuits is configured and arranged to determine a level of the input signal over a frequency range centered at a frequency between 100 and 150 Hertz and to produce the corresponding channel activation signal according to a predetermined relation between the determined level and a corresponding threshold.

6. The interface according to claim 1, wherein the switching matrix is further configured and arranged to produce a quiet output signal, the quiet output signal having a voltage level at least one-quarter of a power supply voltage of the interface, and to provide the quiet output signal to an I/O port corresponding to an asserted channel activation signal.

7. The interface according to claim 1, said interface further comprising a supply voltage sensor configured and arranged to indicate a predetermined relation between a supply voltage of the interface and a predetermined threshold voltage.

8. The interface according to claim 1, said interface further comprising a plurality of supply voltage sensors, each configured and arranged to indicate a predetermined relation between a supply voltage of the interface and a corresponding predetermined threshold voltage, wherein an indication by a supply voltage sensor having a lower threshold voltage is suppressed during an indication by a supply voltage sensor having a higher threshold voltage.

9. The interface according to claim 1, wherein said switching matrix includes a common bus and a plurality of switches, wherein each of the plurality of switches is configured to switch a signal based on a corresponding input signal onto the common bus, according to the state of a corresponding channel activation signal.

10. The interface according to claim 3, wherein the initialization signal is based on a transient level of a voltage of a power supply of the interface.

11. An interface comprising:

a plurality of voice-operated-transmit (VOX) circuits, each configured and arranged to receive a corresponding input signal and to produce, according to a predetermined relation between a level of the input signal and a corresponding threshold, a corresponding channel activation signal;

wherein the plurality of VOX circuits is configured and arranged to prevent, during a period of assertion of a channel activation signal, assertion of any other of the plurality of channel activation signals, and wherein each among the plurality of VOX circuits is further configured and arranged to assert a corresponding push-to-transmit command when a noncorresponding channel activation signal is asserted.

12. The interface according to claim 11, wherein each VOX circuit is coupled to a common control bus and is configured to assert the corresponding push-to-transmit command according to a state of the common control bus.

13. The interface according to claim 11, wherein each VOX circuit is configured to inhibit activation of a corresponding push-to-transmit signal during activation of the corresponding channel activation signal.

14. The interface according to claim 11, wherein the plurality of VOX circuits is further configured and arranged to inhibit an assertion of any among the channel activation signals during a powering-up of the interface.

15. The interface according to claim 11, wherein at least one of the plurality of VOX circuits is configured to continue to assert the corresponding channel activation signal for a period not longer than several seconds after the predetermined relation no longer exists.

16. The interface according to claim 11, wherein the interface is configured to switch, according to a state of a channel activation signal, a signal based on the corresponding input signal onto a common bus.

17. The interface according to claim 11, wherein each VOX circuit is coupled to a corresponding output port, and wherein the interface is configured to provide a nonnull voltage to an output port corresponding to an asserted channel activation signal.

18. The interface according to claim 11, wherein at least one of the plurality of VOX circuits is configured to produce a corresponding channel activation signal based on a level of the input signal over a frequency range including at least a portion of the range from 100 Hertz to 210 Hertz.

19. The interface according to claim 11, wherein at least one of the plurality of VOX circuits is configured to produce a corresponding channel activation signal based on a level of the input signal over a frequency range centered at a frequency between 100 and 150 Hertz.

20. The interface according to claim 11, wherein at least one of the plurality of VOX circuits is configured to produce the corresponding channel activation signal based on the energy content of the corresponding input signal in a plurality of different frequency bands.

21. The interface according to claim 11, wherein at least one of the plurality of VOX circuits is configured to produce the corresponding channel activation signal based on a band-limited portion of the corresponding input signal.

22. The interface according to claim 11, wherein the interface is configured to provide at least one of the push-to-transmit signals over a radio-frequency link.

23. The interface according to claim 16, wherein each VOX circuit is coupled to a corresponding output port, and
wherein the interface is configured to provide a signal based on the common bus to each output port corresponding to a nonasserted channel activation signal.

24. The interface according to claim 22, wherein the interface is configured to provide at least one of the push-to-transmit signals over a Bluetooth radio-frequency link.

25. The interface according to claim 23, wherein, for one of the plurality of VOX circuits, the interface is configured to provide a signal based on the input signal corresponding to the VOX circuit to the output ports corresponding to each of the rest of the plurality of VOX circuits, and
wherein, for another of the plurality of VOX circuits, the interface is configured to provide a signal based on the input signal corresponding to the VOX circuit only to the output ports corresponding to each of fewer than all of the rest of the plurality of VOX circuits.

26. An interface comprising:
a plurality of voice-operated-transmit (VOX) circuits, each configured and arranged to receive a corresponding input signal and to produce, according to a predetermined relation between a level of the input signal and a corresponding threshold, a corresponding channel activation signal;
wherein the plurality of VOX circuits is configured and arranged to prevent, during a period of assertion of a channel activation signal, assertion of any other of the plurality of channel activation signals, and
wherein each among the plurality of VOX circuits is farther configured and arranged to inhibit assertion of a corresponding push-to-transmit command when the corresponding channel activation signal is asserted.

27. The interface according to claim 26, wherein each VOX circuit is coupled to a common control bus and is configured to assert the corresponding push-to-transmit command according to a state of the common control bus.

28. The interface according to claim 26, wherein the plurality of VOX circuits is further configured and arranged to inhibit an assertion of any among the channel activation signals during a powering-up of the interface.

29. The interface according to claim 26, wherein at least one of the plurality of VOX circuits is configured to continue to assert the corresponding channel activation signal for a period not longer than several seconds after the predetermined relation no longer exists.

30. The interface according to claim 26, wherein the interface is configured to switch, according to a state of a channel activation signal, a signal based on the corresponding input signal onto a common bus.

31. The interface according to claim 26, wherein each VOX circuit is coupled to a corresponding output port, and
wherein the interface is configured to provide a nonnull voltage to an output port corresponding to an asserted channel activation signal.

32. The interface according to claim 26, wherein at least one of the plurality of VOX circuits is configured to produce a corresponding channel activation signal based on a level of the input signal over a frequency range including at least a portion of the range from 100 Hertz to 210 Hertz.

33. The interface according to claim 26, wherein at least one of the plurality of VOX circuits is configured to produce a corresponding channel activation signal based on a level of the input signal over a frequency range centered at a frequency between 100 and 150 Hertz.

34. The interface according to claim 26, wherein at least one of the plurality of VOX circuits is configured to produce a corresponding channel activation signal based on the energy content of the corresponding input signal in a plurality of different frequency bands.

35. The interface according to claim 26, wherein at least one of the plurality of VOX circuits is configured to produce a corresponding channel activation signal based on a band-limited portion of the corresponding input signal.

36. The interface according to claim 26, wherein the interface is configured to provide at least one of the push-to-transmit signals over a radio-frequency link.

37. The interface according to claim 30, wherein each VOX circuit is coupled to a corresponding output port, and
wherein the interface is configured to provide a signal based on the common bus to each output port corresponding to a nonasserted channel activation signal.

38. The interface according to claim 36, wherein the interface is configured to provide at least one of the push-to-transmit signals over a Bluetooth radio-frequency link.

39. The interface according to claim 37, wherein, for one of the plurality of VOX circuits, the interface is configured to provide a signal based on the input signal corresponding to the VOX circuit to the output ports corresponding to each of the rest of the plurality of VOX circuits, and
wherein, for another of the plurality of VOX circuits, the interface is configured to provide a signal based on the input signal corresponding to the VOX circuit only to the output ports corresponding to each of fewer than all of the rest of the plurality of VOX circuits.

40. An interface comprising:
a plurality of means for outputting a corresponding channel activation signal based on a predetermined relation between a level of a corresponding input signal and a corresponding threshold,
wherein the plurality of means for outputting is configured and arranged to prevent, during a period of assertion of a channel activation signal, assertion of any other of the plurality of channel activation signals, and
wherein each among the plurality of means for outputting is further configured and arranged to assert a corresponding push-to-transmit command when a noncorresponding channel activation signal is asserted.

* * * * *